(12) United States Patent
Lin et al.

(10) Patent No.: US 9,984,576 B2
(45) Date of Patent: May 29, 2018

(54) METHOD AND SYSTEM FOR DETERMINING LAST POSITION OF A VEHICLE AND METHOD FOR REPORTING THE SAME

(71) Applicant: KWANG YANG MOTOR CO., LTD., Kaohsiung (TW)

(72) Inventors: Chen-Sheng Lin, Kaohsiung (TW); Yi-Yang Tsai, Kaohsiung (TW); John C. Wang, Taipei (TW); Ming-San Huang, Taipei (TW); Chih-Feng Hsu, Taipei (TW); Chi-Hui Hsu, Taipei (TW); Te-Chuan Liu, Taipei (TW); Li-Hui Chen, Taipei (TW); Ping-Chen Su, Taipei (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 0 days. days.

(21) Appl. No.: 15/730,998

(22) Filed: Oct. 12, 2017

(65) Prior Publication Data

US 2018/0108259 A1 Apr. 19, 2018

(30) Foreign Application Priority Data

Oct. 14, 2016 (TW) .............................. 105133148 A

(51) Int. Cl.
*G08G 1/123* (2006.01)
*G08G 1/00* (2006.01)
*B60R 25/33* (2013.01)
*G07C 5/00* (2006.01)

(52) U.S. Cl.
CPC ............. *G08G 1/205* (2013.01); *B60R 25/33* (2013.01); *G07C 5/008* (2013.01); *B60R 2325/205* (2013.01); *B60W 2550/402* (2013.01)

(58) Field of Classification Search
CPC ......... G08G 1/205; B60R 25/33; G07C 5/008
USPC .................................................. 340/988, 989
See application file for complete search history.

(56) References Cited

U.S. PATENT DOCUMENTS

| | | | | |
|---|---|---|---|---|
| 2006/0155430 A1* | 7/2006 | Burgess | ............... | G06Q 10/087 701/1 |
| 2010/0318288 A1* | 12/2010 | Korn | ...................... | G08G 1/005 701/533 |
| 2016/0253748 A1* | 9/2016 | Levy | ...................... | G06Q 10/02 705/13 |
| 2016/0314629 A1* | 10/2016 | Cuddihy | ................. | G07C 5/008 |
| 2016/0359671 A1* | 12/2016 | Larcher | ............... | H04L 41/0886 |
| 2017/0200134 A1* | 7/2017 | Wilson | ................... | G06Q 10/20 |

* cited by examiner

*Primary Examiner* — Kerri McNally
(74) *Attorney, Agent, or Firm* — Brinks Gilson & Lione

(57) ABSTRACT

A method includes steps of: establishing a wireless connection between a dashboard device of a vehicle and a mobile device; recording a position of the mobile device as an entry of recorded position data at predetermined time intervals; transmitting a notification signal to the mobile device via the wireless connection to enable the mobile device to make a determination as to whether the mobile device is currently able to receive a positioning signal; and determining the position of the mobile device based on the positioning signal to serve as the last position of the vehicle in the affirmative, and determining the last position of the vehicle based on a latest entry of the recorded position data when otherwise.

20 Claims, 8 Drawing Sheets

METHOD AND SYSTEM FOR DETERMINING LAST POSITION OF A VEHICLE AND METHOD FOR REPORTING THE SAME

CROSS-REFERENCE TO RELATED APPLICATION

This application claims priority of Taiwanese Patent Application No. 105133148, filed on Oct. 14, 2016.

FIELD

The disclosure relates to a method and a system for determining a last position of a vehicle.

BACKGROUND

Some vehicle like a motorcycle is not equipped with Global Positioning System (GPS) functionality, but it may be desirable for a user of the vehicle to find the vehicle which is previously parked in an unfamiliar place through a GPS-based tracker. In such case, an external GPS device needs to be additionally purchased and installed, causing trouble to the user. On the other hand, for a vehicle built-in with the GPS functionality, the associated production cost and sales price are increased, and sales thereof may be adversely affected.

SUMMARY

Therefore, an object of the disclosure is to provide a method and a system for determining a last position of a vehicle and a method for reporting the last position of a vehicle that can alleviate at least one of the drawbacks of the prior art.

According to one aspect of the disclosure, the method is adapted for determining a last position of a vehicle. The vehicle includes a dashboard device and a power device. The method is to be implemented by a mobile device and the dashboard device. The mobile device receives a positioning signal and keeps on determining a position of the mobile device based on the positioning signal thus received. The dashboard device is communicable with the mobile device. The power device includes a power switch that is operable to switch between a Key ON state where the dashboard device is powered by the power device and a Key OFF state where the dashboard device is powered by the power device only for a preset duration. The method includes the following steps:

establishing, by the dashboard device when it is determined by the dashboard device that the power switch is switched to the Key ON state, a wireless connection between the dashboard device and the mobile device;

recording, by the mobile device, the position of the mobile device thus determined as an entry of recorded position data at predetermined time intervals;

transmitting, by the dashboard device when it is determined by the dashboard device that the power switch is switched to the Key OFF state, a notification signal to the mobile device via the wireless connection so as to enable the mobile device to determine whether the mobile device is currently able to receive the positioning signal;

determining, by the mobile device when it is determined that the mobile device is currently able to receive the positioning signal, the position of the mobile device based on the positioning signal currently received and making the position thus determined serve as the last position of the vehicle; and determining, by the mobile device when it is determined that the mobile device is currently unable to receive the positioning signal, a latest entry of the recorded position data, and making the position of the mobile device that corresponds to the latest entry of the recorded position data serve as the last position of the vehicle.

According to another aspect of the disclosure, the system is adapted for determining a last position of a vehicle. The vehicle includes a power switch that is operable to switch between a Key ON state and a Key OFF state. The system includes a mobile device and a dashboard device of the vehicle. The mobile device receives a positioning signal, and keeps on determining a position of the mobile device based on the positioning signal thus received and records the position of the mobile device thus determined as an entry of recorded position data at predetermined time intervals. The dashboard device is communicable with the mobile device. The dashboard device is powered when the power switch is switched to the Key ON state, and is powered only for a preset duration when the power switch is switched to the Key OFF state. The dashboard device includes a wireless communication module and a processing module connected with the wireless communication module. The processing module is configured to control the wireless communication module to establish a wireless connection between the dashboard device and the mobile device when it is determined by the processing module that the power switch is switched to the Key ON state. The processing module is configured to transmit a notification signal to the mobile device via the wireless connection so as to enable the mobile device to determine whether the mobile device is currently able to receive the positioning signal when it is determined by the processing module that the power switch is switched to the Key OFF state. The mobile device is configured to, when it is determined that the mobile device is currently able to receive the positioning signal, determine the position of the mobile device based on the positioning signal currently received and make the position thus determined serve as the last position of the vehicle. The processing module is configured to, when it is determined that the mobile device is currently unable to receive the positioning signal, determine a latest entry of the recorded position data, and make the position of the mobile device that corresponds to the latest entry of the recorded position data serve as the last position of the vehicle.

According to still another aspect of the disclosure, the method is adapted for reporting a last position of a vehicle. The vehicle includes a dashboard device and a power device. The method is to be implemented by a mobile device and the dashboard device. The mobile device receives a positioning signal and keeps on determining a position of the mobile device based on the positioning signal thus received. The dashboard device is communicable with the mobile device. The power device includes a power switch that is operable to switch between a Key ON state where the dashboard device is powered by the power device and a Key OFF state where the dashboard device is powered by the power device only for a preset duration. The method includes the following steps:

establishing, by the dashboard device when it is determined by the dashboard device that the power switch is switched to the Key ON state, a wireless connection between the dashboard device and the mobile device;

recording, by the mobile device, the position of the mobile device thus determined and a time point at which the position of the mobile device is determined based on the positioning signal as an entry of recorded position data at predetermined time intervals;

determining, by the mobile device when it is determined by the mobile device that the wireless connection between the dashboard device and the mobile device is interrupted, a latest entry of the recorded position data, the position of the mobile device that corresponds to the latest entry of the recorded position data serving as the last position of the vehicle; and transmitting, by the mobile device, the position of the mobile device that corresponds to the latest entry of the recorded position data and that serves as the last position of the vehicle to a cloud server.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
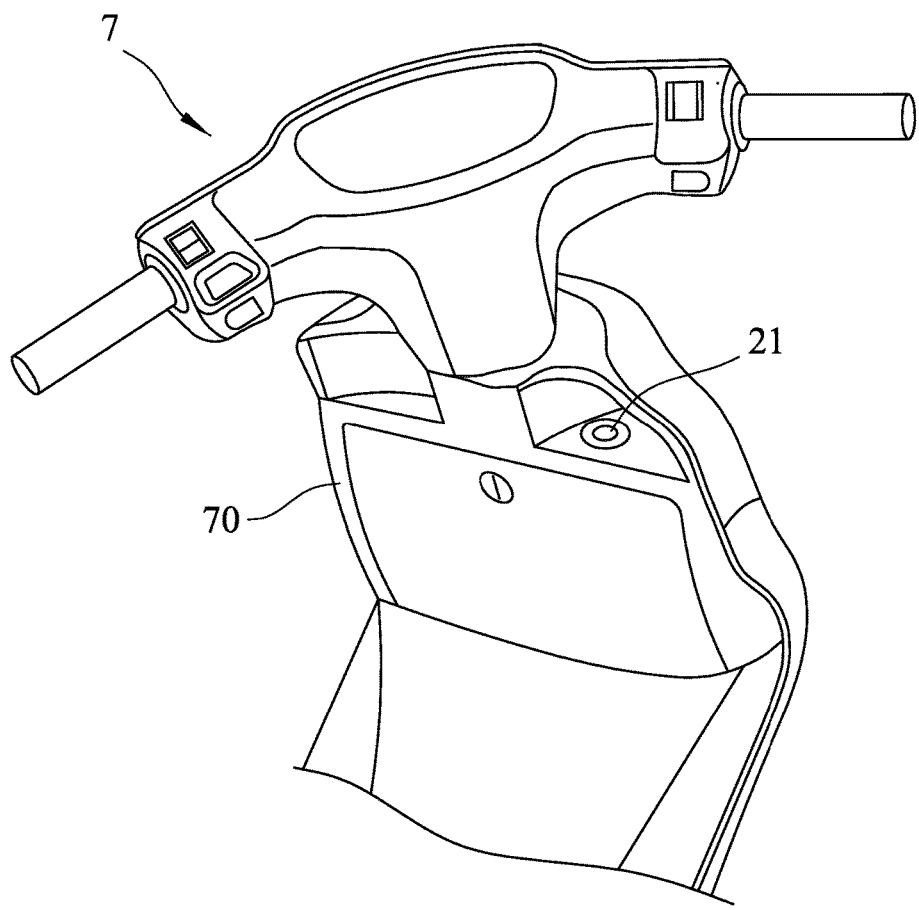
FIG. 1 is a fragmentary schematic perspective view illustrating an embodiment of a vehicle according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
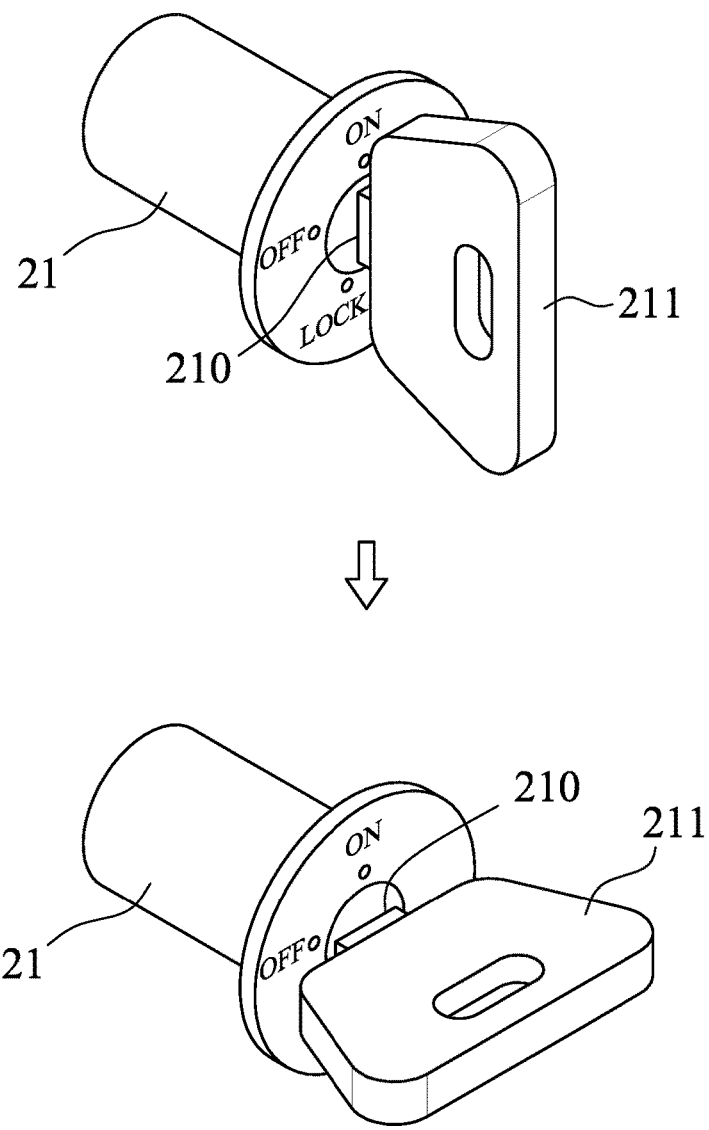
FIG. 2 is a schematic perspective view illustrating an embodiment of a power switch being switched to one of a Key ON state and a Key OFF state.
Figure 3:
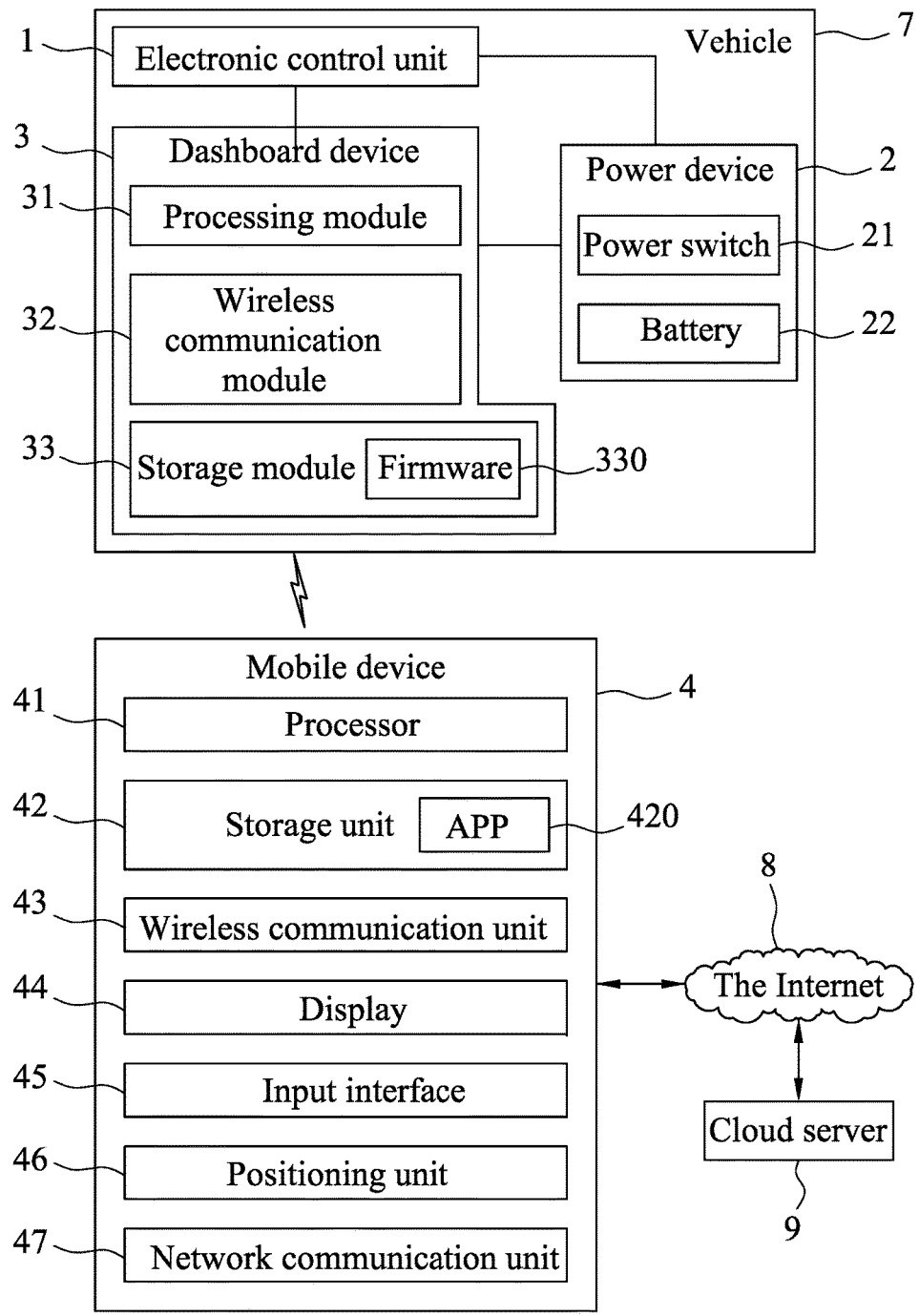
FIG. 3 is a block diagram illustrating an embodiment of a system for determining a last position of a vehicle according to the disclosure.

Referring to FIGS. 1 to 3, an embodiment of a system of a vehicle 7 for determining a last position of the vehicle 7 is illustrated. The vehicle 7 may be implemented by a motorcycle, an automobile, an All Terrain Vehicle (ATV), a Utility Vehicle (UV), an electric scooter, or the like. As shown in FIGS. 1 and 3, the vehicle 7 includes a vehicle body 70, a dashboard device 3, an electronic control unit (ECU) 1 accommodated within the vehicle body 70 and electrically connected to the dashboard device 3, and a power device 2 electrically connected to the ECU 1 and the dashboard device 3. In this embodiment, the system of this disclosure includes the dashboard device 3 and a mobile device 4.

Referring to FIGS. 2 and 3, the power device 2 includes a battery 22 and a power switch 21 that is a main switch of the vehicle 7 and that is operable to switch between a Key ON state and a Key OFF state. The power switch 21 includes a keyhole 210 and a key 211 configured to be inserted into the keyhole 210 as shown in FIG. 2. By turning the key 211 inserted in the key hole 210, the power switch 21 can be switched to the Key ON state when the key 211 is turned clockwise to a position labeled "ON", and to the Key OFF state when the key 211 is turned counterclockwise to another position labeled "OFF". The dashboard device 3 is powered when the power switch 21 is switched to the Key ON state, and is only powered for a preset duration counting from the time when the power switch 21 is switched to the Key OFF state when the power switch 21 is in the Key OFF state. When the preset duration during which the dashboard device 3 is temporarily powered by the power device 2 while the power switch 21 is in the Key OFF state has elapsed, the dashboard device 3 ceases to be powered by the power device 2. It should be noted that implementation of the power switch 21 is not limited to what is disclosed herein, and may vary in other embodiments. For example, the power switch 21 may be implemented by a push switch or a knob switch that is turnable to switch between states after the vehicle 7 is unlocked through detection of a chip key (e.g., a keyless ignition system). The preset duration may be for example 60 seconds, and can be set to any time duration based on different needs in practice.

The mobile device 4 may be implemented by a smartphone or a tablet, but is not limited thereto. In this embodiment, the mobile device 4 includes a processor 41, a storage unit 42 storing an application program (APP) 420, a wireless communication unit 43 (e.g., a Bluetooth wireless interface), a display 44, an input interface 45 (e.g., a touchscreen or a keypad), a positioning unit 46 (e.g., a GPS receiver) and a network communication unit 47 (e.g., a separate communication chip supporting the current generation of mobile telephony or a built-in cellular modem in the processor 41). A user can operate the mobile device 4 via the input interface 45 according to prompt information of the APP 420 provided on the display 44.

The mobile device 4 is configured to receive a positioning signal by the positioning unit 46, to keeps on determining a position of the mobile device 4 based on the positioning signal thus received by the positioning unit 46, and to record the position of the mobile device 4 thus determined as an entry of recorded position data at predetermined time intervals (e.g., every five seconds). It should be noted that when the mobile device 4 is carried by the user on the vehicle 7 and movable along with the vehicle 7, the position of the mobile device 4 thus determined may be regarded as a position of the vehicle 7. The storage unit 42 may be implemented by a non-volatile memory, such as a flash memory, and is configured to store the entries of recorded position data associated with respective positions of the vehicle 7 recorded at the predetermined time intervals. In one embodiment, the network communication unit 47 is communicable with a cloud server 9 via the Internet 8 as shown in FIG. 3, and is configured to transmit the entries of recorded position data thus stored in the storage unit 42 to the cloud server 9 synchronously with respect to storage of the entries of recorded position data, so that the entries of recorded position data can be accessed by logging into the cloud server 9 with another mobile device (not shown) for tracking the vehicle 7.

The dashboard device 3 of the vehicle 7 is communicable with the mobile device 4. Specifically speaking, the dashboard device 3 includes a wireless communication module 32, a storage module 33, and a processing module 31 connected with the wireless communication module 32 and the storage module 33.

In this embodiment, the wireless communication module 32 is implemented by a Bluetooth wireless interface, such as a Bluetooth low energy (BLE) chip or a Bluetooth System-on-Chip (SoC), but implementation thereof is not limited thereto.

In this embodiment, the storage module 33 may be implemented by a flash memory, a hard disk drive or a solid state disk, but is not limited thereto. The storage module 33 is configured to store firmware 330 that serves as an operating system (OS) of the dashboard device 3.

In this embodiment, the processing module 31 may be implemented by a processor, a Central Processing Unit (CPU), a microprocessor or any circuit configurable/programmable in a software manner and/or hardware manner to implement functionalities discussed in this disclosure.

The processing module 31 is configured to control the wireless communication module 32 to establish a wireless connection, which is implemented based on Bluetooth technology in this embodiment and may be implemented based on any compatible communication protocol in other embodiments, between the wireless communication module 32 of the dashboard device 3 and the wireless communication unit 43 of the mobile device 4 when it is determined by the processing module 31 that the power switch 21 is switched to the Key ON state. The processing module 31 is further configured to transmit a notification signal to the mobile device 4 via the wireless connection so as to enable the mobile device 4 to determine whether the mobile device 4 is currently able to receive the positioning signal when it is determined by the processing module 31 that the power switch 21 is switched to the Key OFF state. In addition, the processing module 31 is configured to control the power device 2 to power the dashboard device 3 by the battery 22 when the power switch 21 is switched to the Key ON state, and to control the power device 2 to temporarily power the dashboard device 3 by the battery 22 for the preset duration once the power switch 21 is switched to the Key OFF state, so as to maintain the wireless connection for the preset duration.

The mobile device 4 is configured to determine, when it is determined that the mobile device 4 is currently able to receive the positioning signal, the position of the mobile device 4 based on the positioning signal currently received which serves as the last position of the vehicle 7. Otherwise, i.e., when it is determined that the mobile device 4 is currently unable to receive the positioning signal, the mobile device 4 is configured to determine a latest entry of the recorded position data, where the position of the mobile device 4 that corresponds to the latest entry of the recorded position data serves as the last position of the vehicle 7. Through operating the mobile device 4 which is executing the APP 420, the display 44 of the mobile device 4 is configured to present the last position of the vehicle 7 in a predetermined form of presentation. The mobile device 4 is further configured to present, by the predetermined form of presentation, a last time of appearance which is associated with the time when the vehicle 7 appears at the last position thereof and a distance between a current position of the mobile device 4 and the last position of the vehicle 7.

Figure 5:
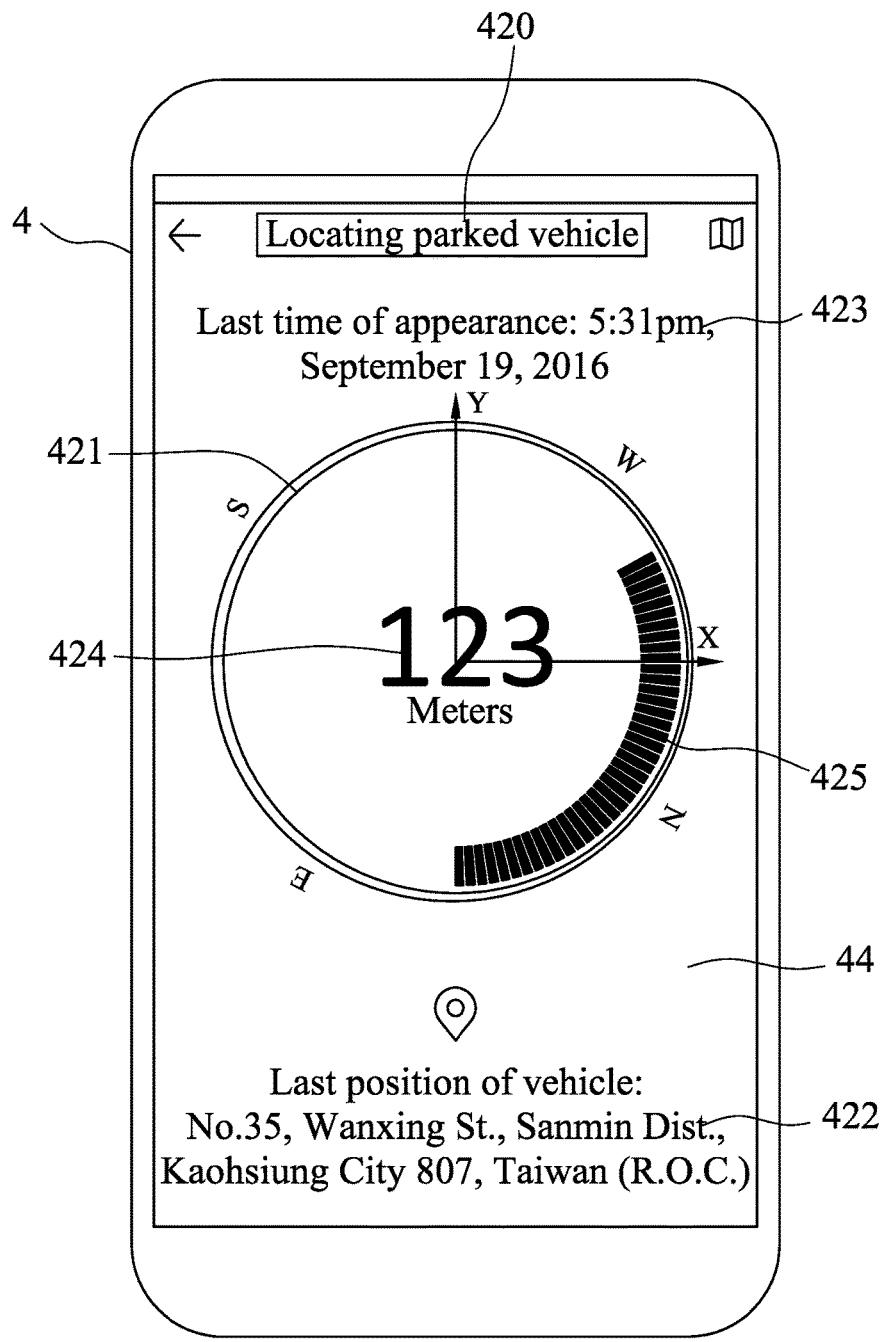
FIG. 5 is a schematic diagram illustrating an embodiment of a predetermined form of presentation in which the last position of the vehicle is presented on a mobile device, wherein a distance between a current position of the mobile device and the last position of the vehicle is about 123 meters.
Figure 6:
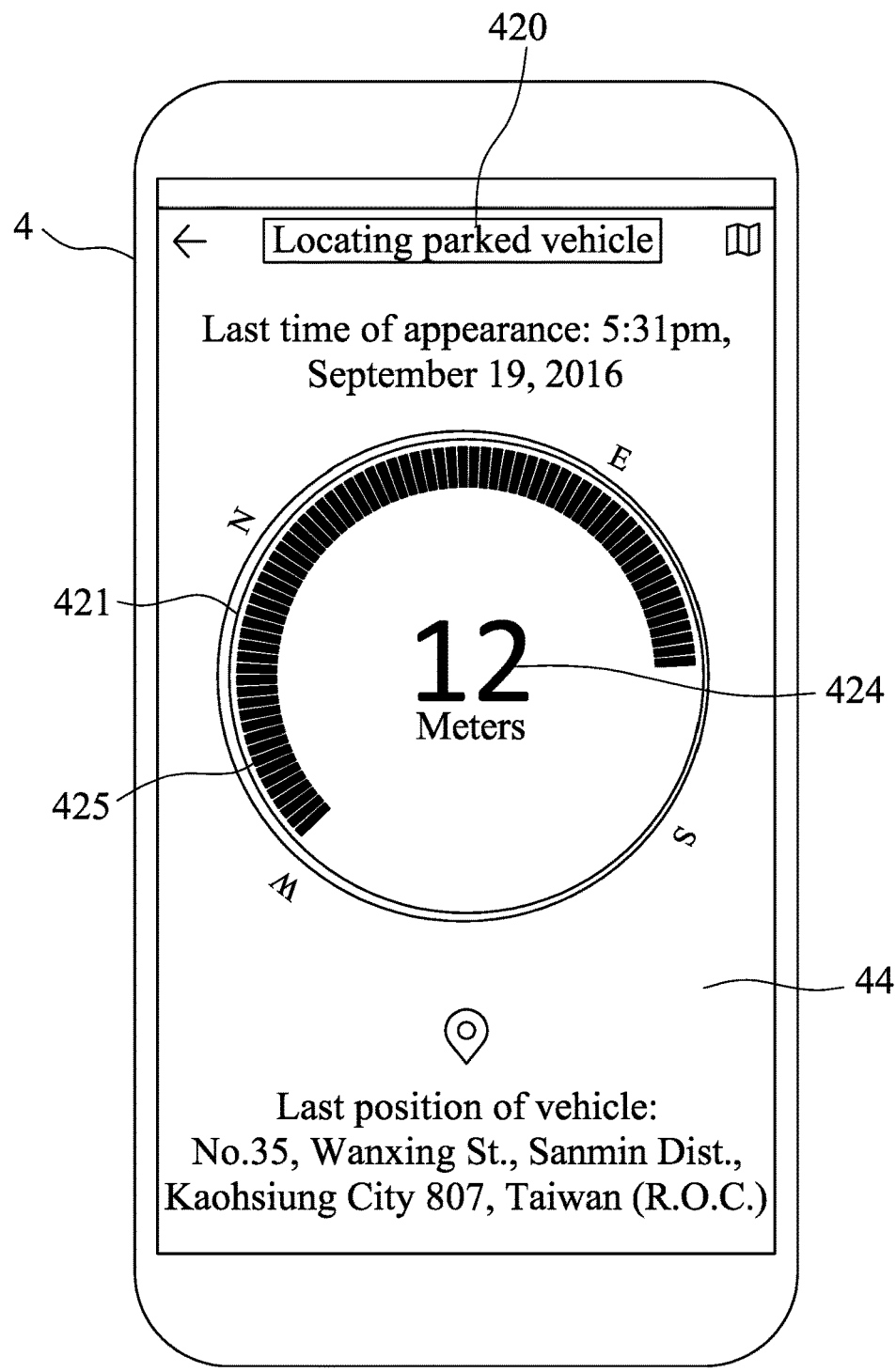
FIG. 6 is a schematic diagram illustrating the embodiment of the predetermined form of presentation, wherein the distance between the current position of the mobile device and the last position of the vehicle is about 12 meters.
Figure 7:
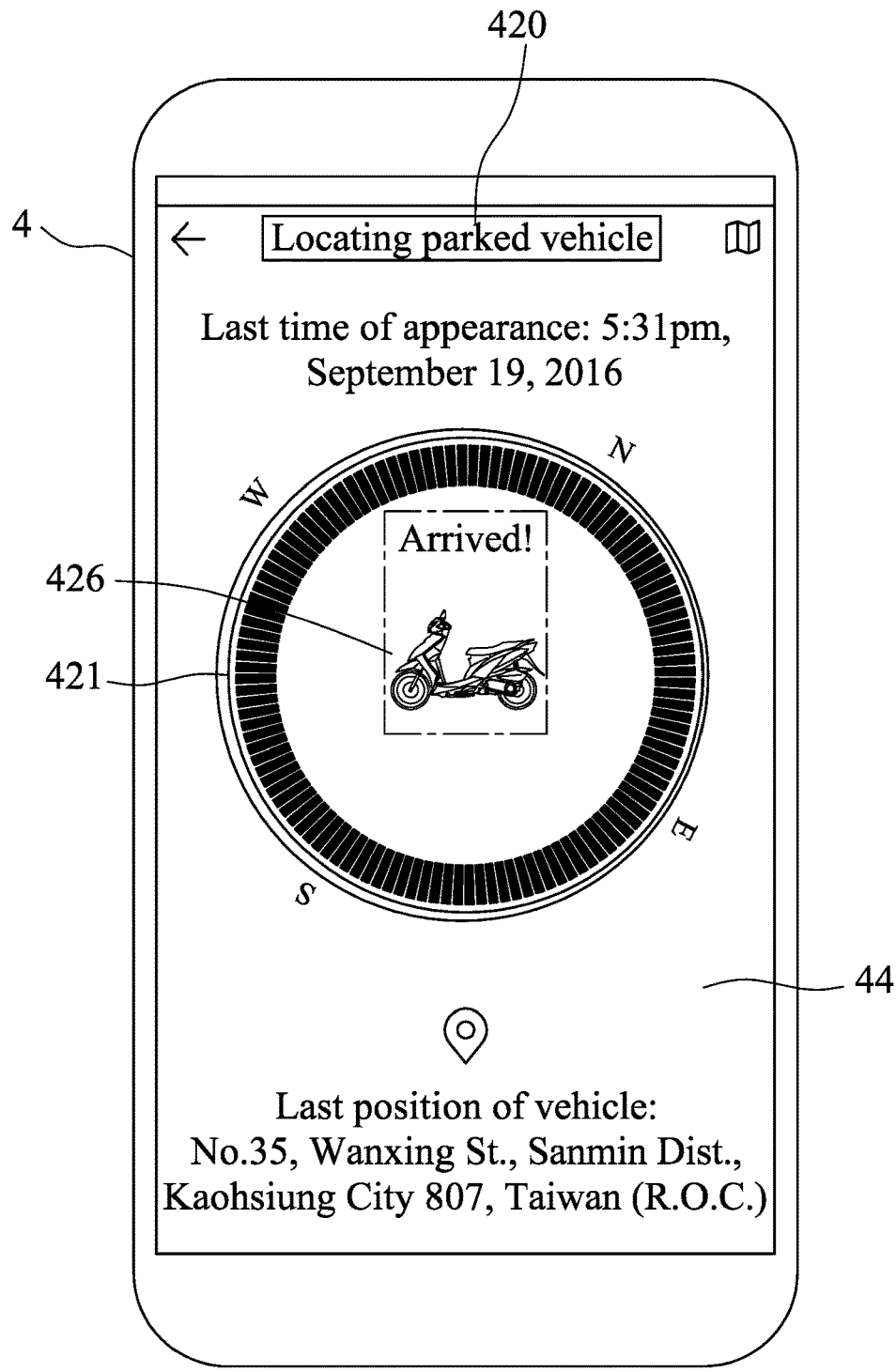
FIG. 7 is a schematic diagram illustrating the embodiment of the predetermined form of presentation, wherein the mobile device is carried to arrive at the last position of the vehicle.

The predetermined form of presentation includes a map for navigation (not shown), or a compass 421 for navigation which indicates a direction of the last position of the vehicle 7 with respect to the current position of the mobile device 4, as shown in FIGS. 5 to 7. Specifically speaking, the compass 421 is circular in shape as exemplified in FIG. 5, and is configured to indicate the current orientation of the mobile device 4 by a compass rose thereof with an imaginary arrow (Y) pointing upward and serving to indicate a pointing direction the mobile device 4, as shown in FIG. 5. The predetermined form of presentation further includes a visual presentation of position information 422, such as an address, associated with the last position of the vehicle 7, a visual presentation of time information 423 associated with the last time of appearance, and a numerical presentation 424 associated with the distance (i.e., "123 meters" as shown in FIG. 5). Moreover, the compass 421 includes an arc 425 a midpoint of which is used to indicate the direction of the last position of the vehicle 7 with respect to the current position of the mobile device 4, and a length of which is used to indicate the distance between the current position of the mobile device 4 and the last position of the vehicle 7. A shorter length of the arc 425 represents a longer distance between the current position of the mobile device 4 and the last position of the vehicle 7; contrarily, a longer length of the arc 425 represents a shorter distance between the current position of the mobile device 4 and the last position of the vehicle 7.

To clarify the operation of the embodiment of the system, reference is made to an example illustrated in FIGS. 5 to 7. In FIG. 5, the numerical presentation 424 at the center of the compass 421 indicates that the distance between the current position of the mobile device 4 and the last position of the vehicle 7 is about 123 meters, and the compass 421 indicates that the mobile device 4 is oriented to point at the direction of west-southwest. As a result, it is necessary to orient the mobile device 4 toward the north direction in order to approach the last position of the vehicle 7. Referring to FIGS. 6 and 7, as the mobile device 4 approaches the last position of the vehicle 7, the distance between the current position of the mobile device 4 and the last position of the vehicle 7 gradually decreases. For example, as shown in FIG. 6, the numerical presentation 424 indicates that the distance is shortened to twelve meters, the midpoint of the arc 425 indicates the direction of the last position of the vehicle 7 with respect to the current position of the mobile device 4, and the compass 421 indicates that the mobile device 4 is currently east-northeast pointing. Eventually, when it is determined that by the mobile device 4 that the current position of the mobile device 4 matches the last position of the vehicle 7, a notification message 426 exemplified in FIG. 7 is displayed on the display 44 to indicate that the mobile device 4 has been carried to arrive at the last position of the vehicle 7.

Figure 4:
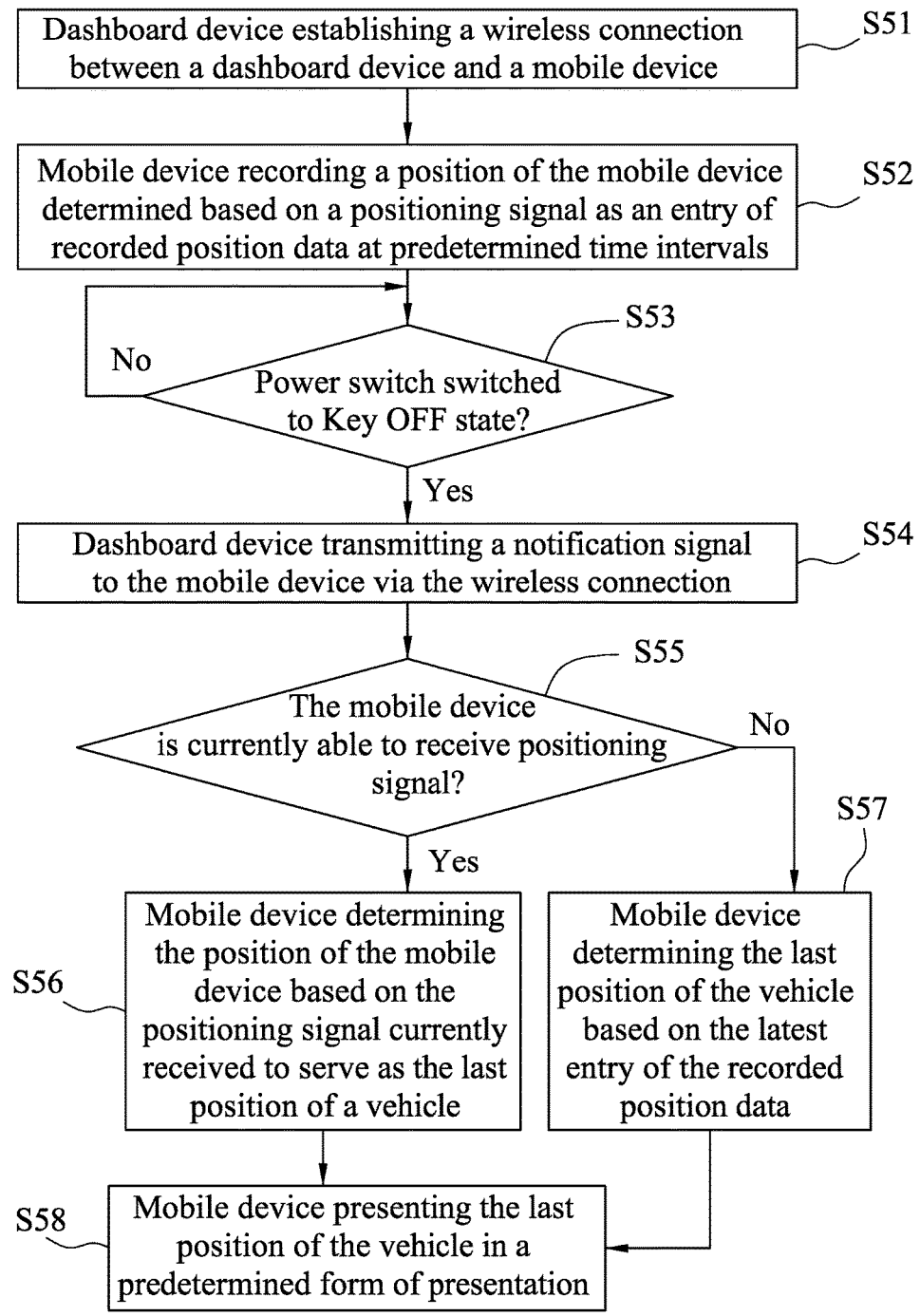
FIG. 4 is a flow diagram illustrating an embodiment of a method for determining a last position of a vehicle according to the disclosure.

Referring to FIGS. 3 and 4, a first embodiment of a method for determining a last position of the vehicle 7 of this disclosure is illustrated. The method is to be implemented by the dashboard device 3 of the vehicle 7 and the mobile device 4 mentioned above. The method includes the following steps S51 to S58.

When the power switch 21 is switched, by turning the key 211, from the Key OFF state to the Key ON state, the dashboard device 3 is powered by the power device 2 and the vehicle 7 is ready to be driven. In step S51, the processing module 31 establishes, based on Bluetooth technology, the wireless connection between the wireless communication module 32 of the dashboard device 3 and the wireless communication unit 43 of the mobile device 4 when it is determined by the dashboard device 3 that the power switch 21 is switched to the Key ON state where the dashboard device 3 is powered by the power device 2. In step S52, the processor 41 of the mobile device 4 repeatedly records, in the storage unit 42, the position of the mobile device 4 determined based on the positioning signal as an entry of recorded position data at predetermined time intervals. Additionally, the mobile device 4 records, in the storage unit 42, the time point at which the position of the mobile device 4 is determined based on the positioning signal. In this way, plural entries of recorded position data associated with the respective positions of the vehicle 7 and the respective time points are stored in the storage unit 42.

In step S53, the processing module 31 of the dashboard device 3 determines whether the power switch 21 is switched to the Key OFF state based on whether or not a cutoff signal, which indicates that the power switch 21 is switched to the Key OFF state, is received from the power device 2. When it is determined by the processing module 31 of the dashboard device 3 that the cutoff signal is not received from the power device 2, it means that the power switch 21 of the vehicle is still in the Key ON state (i.e., the Key ON state where the vehicle 7 is drivable), and the processing module 31 of the dashboard device 3 continues with the determination as to whether the cutoff signal is received from the power device 2 (i.e., step S53 is repeated).

Differently, when it is determined in step S53 that the power switch 21 is switched, by turning the key 211, from the Key ON state to the Key OFF state (e.g., the vehicle 7 may be parked), the processing module 31 controls the power device 2 to continue to power the dashboard device 3 for the preset duration so that the wireless connection is temporarily maintained, and a flow of this method proceeds to step S54. In step S54, the processing module 31 of the dashboard device 3 transmits the notification signal to the mobile device 4 via the wireless connection so as to enable the processor 41 of the mobile device 4 to determine whether the mobile device 4 is currently able to receive the positioning signal as shown in step S55.

When it is determined by the processor 41 of the mobile device 4 in step S55 that the mobile device 4 is currently able to receive the positioning signal, which may occur in a scenario that the vehicle 7 is parked outdoors (e.g., at an outdoor parking lot), the flow proceeds to step S56, where the processor 41 of the mobile device 4 determines the position of the mobile device 4 based on the positioning signal currently received to serve as the last position of the vehicle 7.

On the other hand, when it is determined by the processor 41 of the mobile device 4 in step S55 that the mobile device 4 is currently unable to receive the positioning signal, it means that the vehicle 7 may be parked indoors (e.g., at an indoor parking lot), step S57 is performed, in which the processor 41 determines the latest entry of the recorded position data, and makes the position of the mobile device 4 that corresponds to the latest entry of the recorded position data serve as the last position of the vehicle 7.

In step S58, the processor 41 of the mobile device 4 controls the display 44 to present the last position of the vehicle 7 in the predetermined form of presentation, which includes one of the map (not shown) for navigation and the aforementioned compass 421 (as shown in FIG. 5) for navigation with an indication of the direction of the last position of the vehicle 7 with respect to the current position of the mobile device 4.

Figure 8:
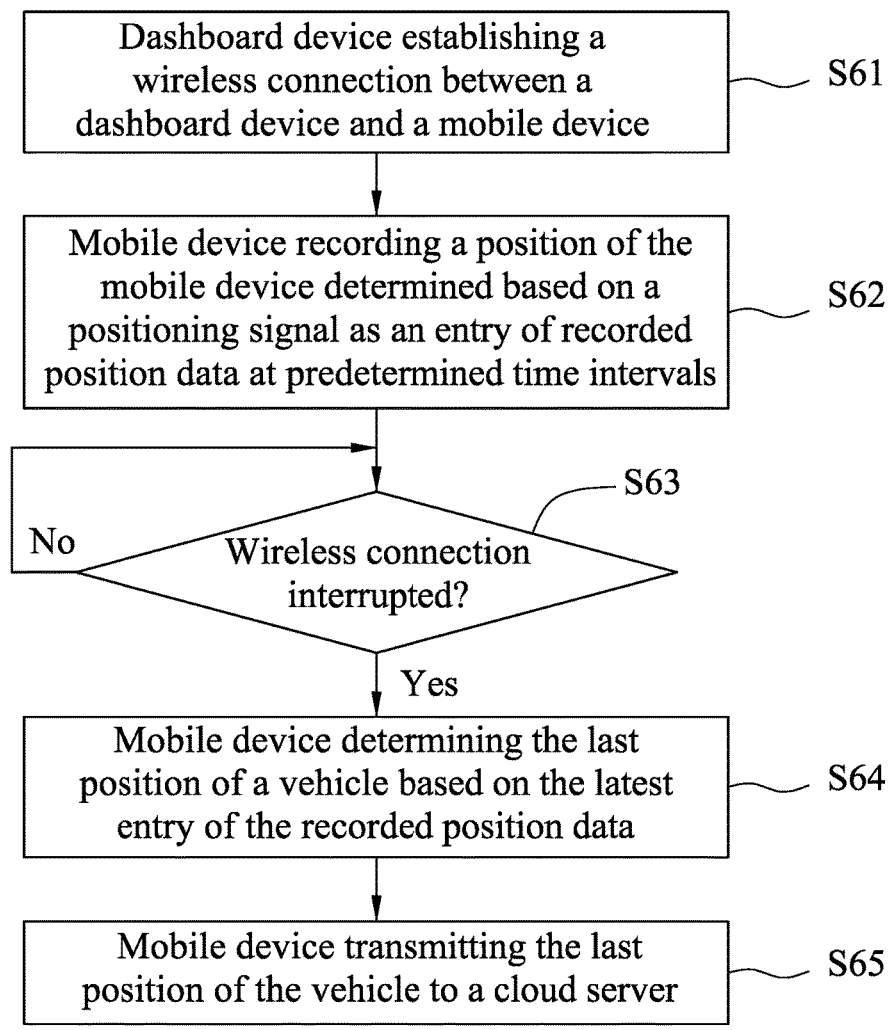
FIG. 8 is a flow diagram illustrating an embodiment of a method for reporting a last position of a vehicle according to the disclosure.

Referring to FIGS. 3 and 8, an embodiment of a method for reporting a last position of a vehicle 7 according to this disclosure is illustrated. This embodiment is similar to the aforementioned embodiment of the method for determining a last position of a vehicle 7 and is to be implemented by the dashboard device 3 of the vehicle 7 and the mobile device 4 introduced previously. The embodiment of the method includes the following steps S61 to S65.

At the beginning, the dashboard device 3 is powered by the power device 2 when the power switch 21 is switched, by turning the key 211, from the Key OFF state to the Key ON state, and the vehicle 7 is ready to be driven. Next, in step S61, the processing module 31 establishes the wireless connection between the wireless communication module 32 of the dashboard device 3 and the wireless communication unit 43 of the mobile device 4 when it is determined by the dashboard device 3 that the power switch 21 is switched to the Key ON state.

The positioning unit 46 (e.g., the GPS receiver in this embodiment) receives the positioning signal and the processor 41 determines the position of the mobile device 4. In step S62, the processor 41 records the position of the mobile device 4 thus determined and the time at which the position of the mobile device 4 is determined in the storage unit 42 as an entry of recorded position data. The determination of the position of the mobile device 4 is continuously performed, and the recordation of the relevant position data and time are repeatedly performed at predetermined time intervals (e.g., every five seconds). Moreover, the network communication unit 47 is communicable with the cloud server 9 via the Internet 8 as shown in FIG. 3, and is configured to transmit the entries of recorded position data to the cloud server 9 synchronously with respect to recordation of the entries of recorded position data, so that the entries of recorded position data can be accessed by logging into the cloud server 9 from another mobile device (not shown) with appropriate account and password for tracking the vehicle 7.

In step S63, the processor 41 determines whether the wireless connection between the dashboard device 3 and the mobile device 4 is interrupted.

Step S63 is performed once again when the determination made in step S63 is negative; that is to say, the processor 41 keeps detecting if the wireless connection is interrupted until an interruption is actually detected. Otherwise, in the affirmative, i.e., when it is determined by the processor 41 that the wireless connection between the dashboard device 3 and the mobile device 4 is interrupted, step S64 is performed, in which the processor 41 of the mobile device 4 determines the latest entry of the recorded position data and makes the position of the mobile device 4 that corresponds to the latest entry of the recorded position data serve as the last position of the vehicle 7. Similar to step S62, in step S64, the mobile device 4 transmits the position of the mobile device 4 that corresponds to the latest entry of the recorded position data and that serves as the last position of the vehicle 7 to the cloud server 9 as well.

In step S65, the processor 41 of the mobile device 4 controls the display 44 to present, in the predetermined form of presentation, the last position of the vehicle 7, the last time of appearance which is associated with the time when the vehicle 7 appears at the last position thereof, and the distance between a current position of the mobile device 4 and the last position of the vehicle 7. The last time of appearance may be decided based on time information corresponding to the latest entry of the recorded position data determined in step S64. The predetermined form of presentation may include the map (not shown) for navigation or the aforementioned compass 421 for navigation that is circular in shape as illustrated in FIGS. 5 to 7, as well as the additional visual presentations and indicators.

The interruption mentioned in step S63 of this embodiment of the method may occur in a scenario that the vehicle 7 is involved in an accident that leads to damage of the dashboard device 3 thereof, so the wireless connection between the dashboard device 3 and the mobile device 4 is interrupted. If a victim of the accident, who may be the driver of the vehicle 7, is seriously injured and unable to call for assistance with the mobile device 4 by himself/herself, and there happens to be no one nearby to help, the mobile device 4 can automatically transmit the latest entry of the recorded position data (containing the last position of the vehicle 7) to the cloud server 9 when the wireless connection is determined to be interrupted. In one embodiment, the mobile device 4 may simultaneously transmit alert messages associated with the last position of the vehicle 7 by Short Message Service (SMS) or by Multimedia Messaging Service (MMS) to relatives (or friends) of the victim, allowing the relatives of the victim to call for assistance for the victim according to the alert messages, and people who come to the rescue may be provided with guidance to reach the site of the accident (e.g., by the APP 420 installed in their mobile devices for navigation based on the last position of the vehicle 7 uploaded to the cloud server 9).

In summary, the method and the system of this disclosure are implemented to determine the last position of a vehicle 7 by utilizing positioning functionality of the mobile device 4 and the wireless connection (i.e., the Bluetooth connection) established between the mobile device 4 and the dashboard device 3 of the vehicle 7, so as to track a parked location of the vehicle 7 when the power switch 21 of the vehicle is turned to the Key OFF state. In addition, when the vehicle 7 is parked at a location (e.g., in a roofed garage) where the mobile device 4 in the vehicle 7 is temporarily unable to receive the positioning signal, the position of the mobile device 4 corresponding to the latest entry of the recorded position data will be determined to serve as the last position of the vehicle 7. Additionally, the APP 420 installed in the mobile device 4 facilitates users to arrive at the last position of the vehicle 7. Moreover, replacing a built-in GPS device of the vehicle 7 with a mobile device 4 separated from the vehicle 7 that has GPS functionality saves production cost of the vehicle 7 and eliminates GPS installation on the vehicle 7. Furthermore, the mobile device 4 transmits the entries of recorded position data thus stored to a cloud server 9 synchronously with respect to storage of the entries of recorded position data, so that the entries of recorded position data can be accessed by logging into the cloud server 9 with another mobile device. Therefore, when the wireless communication between the mobile device 4 and the vehicle 7 is interrupted in a traffic accident, rescue personnel and related people may still find useful information regarding the time and position of occurrence of the accident.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for determining a last position of a vehicle, the vehicle including a dashboard device and a power device, the method to be implemented by a mobile device that receives a positioning signal and that keeps on determining a position of the mobile device based on the positioning signal thus received, and the dashboard device that is communicable with the mobile device, the power device including a power switch that is operable to switch between a Key ON state where the dashboard device is powered by the power device and a Key OFF state where the dashboard device is temporarily powered by the power device, the method comprising:

establishing, by the dashboard device when it is determined by the dashboard device that the power switch is switched to the Key ON state, a wireless connection between the dashboard device and the mobile device;

recording, by the mobile device, the position of the mobile device thus determined as an entry of recorded position data at predetermined time intervals;

transmitting, by the dashboard device when it is determined by the dashboard device that the power switch is switched to the Key OFF state, a notification signal to the mobile device via the wireless connection so as to enable the mobile device to determine whether the mobile device is currently able to receive the positioning signal;

determining, by the mobile device when it is determined that the mobile device is currently able to receive the positioning signal, the position of the mobile device based on the positioning signal currently received and making the position of the mobile device thus determined serve as the last position of the vehicle; and determining, by the mobile device when it is determined that the mobile device is currently unable to receive the positioning signal, a latest entry of the recorded position data, and making the position of the mobile device that corresponds to the latest entry of the recorded position data serve as the last position of the vehicle.

2. The method as claimed in claim 1, wherein in the establishing a wireless connection, the wireless connection is established based on Bluetooth technology.

3. The method as claimed in claim 1, further comprising:
presenting, by the mobile device, the last position of the vehicle in a predetermined form of presentation.

4. The method as claimed in claim 3, wherein the predetermined form of presentation includes at least one of a map for navigation or a compass for navigation, and an indicator to indicate a direction of the last position of the vehicle with respect to a current position of the mobile device.

5. The method as claimed in claim 3, wherein the presenting the last position of the vehicle includes presenting, by the mobile device, a last time of appearance which is associated with a time point when the vehicle appears at the last position thereof, and a distance between a current position of the mobile device and the last position of the vehicle.

6. The method as claimed in claim 5, wherein the recording the position of the mobile device includes recording a time point at which the position of the mobile device is determined based on the positioning signal, the last time of appearance being presented based on the time point thus recorded.

7. A system for determining a last position of a vehicle, the vehicle including a power switch that is operable to switch between a Key ON state and a Key OFF state, said system comprising:
  a mobile device that receives a positioning signal, and that determines a position of said mobile device based on the positioning signal thus received, and records the position of said mobile device thus determined as an entry of recorded position data at predetermined time intervals; and
  a dashboard device of the vehicle that is communicable with said mobile device, that is powered when the power switch is switched to the Key ON state, that is temporarily powered when the power switch is switched to the Key OFF state, and that includes
    a wireless communication module, and
    a processing module connected with said wireless communication module, and configured to
      control said wireless communication module to establish a wireless connection between said dashboard device and said mobile device when it is determined by said processing module that the power switch is switched to the Key ON state, and
      transmit a notification signal to said mobile device via the wireless connection so as to enable said mobile device to determine whether said mobile device is currently able to receive the positioning signal when it is determined by said processing module that the power switch is switched to the Key OFF state,
  wherein said mobile device is configured to
    when it is determined that said mobile device is currently able to receive the positioning signal, determine the position of said mobile device based on the positioning signal currently received, and make the position thus determined serve as the last position of the vehicle, and
    when it is determined that said mobile device is currently unable to receive the positioning signal, determine a latest entry of the recorded position data, and make the position of said mobile device that corresponds to the latest entry of the recorded position data serve as the last position of the vehicle.

8. The system as claimed in claim 7, wherein the wireless connection is established based on Bluetooth technology.

9. The system as claimed in claim 7, wherein said mobile device includes a display configured to present the last position of the vehicle in a predetermined form of presentation.

10. The system as claimed in claim 9, wherein the predetermined form of presentation includes a map for navigation.

11. The system as claimed in claim 9, wherein the predetermined form of presentation includes a compass for navigation and an indicator that indicates a direction of the last position of the vehicle with respect to a current position of said mobile device.

12. The system as claimed in claim 11, wherein the compass is circular in shape, and is configured to indicate the current orientation of said mobile device, to indicate the direction of the last position of the vehicle with respect to the current position of said mobile device by a midpoint of an arc, and a length of which indicates a distance between the current position of said mobile device and the last position of the vehicle.

13. The system as claimed in claim 9, wherein said mobile device is further configured to present a last time of appearance which is associated with the time when the vehicle appears at the last position thereof in the predetermined form of presentation.

14. The system as claimed in claim 9, wherein said mobile device is further configured to present a distance between a current position of said mobile device and the last position of the vehicle in the predetermined form of presentation.

15. The system as claimed in claim 9, wherein said mobile device is further configured to present, in the predetermined form of presentation, a last time of appearance which is associated with the time when the vehicle appears at the last position thereof and a distance between a current position of said mobile device and the last position of the vehicle.

16. The system as claimed in claim 7, the vehicle further including a power device, the power device including the power switch and a battery, wherein:
  said processing module is configured to control the power device to power said dashboard device with the battery when the power switch is switched to the Key ON state, and to control the power device to power said dashboard device with the battery only for a preset duration when the power switch is switched to the Key OFF state, so as to maintain the wireless connection for the preset duration.

17. The system as claimed in claim 7, wherein the power switch is a main switch of the vehicle.

18. The system as claimed in claim 7, wherein said mobile device includes:
  a storage unit that is configured to store the entries of recorded position data associated with respective positions of the vehicle recorded at the predetermined time intervals; and
  a network communication unit that is communicable with a cloud server, and that is configured to transmit the entries of recorded position data thus stored to the cloud server synchronously with respect to storage of the entries of recorded position data.

19. A method for reporting a last position of a vehicle, the vehicle including a dashboard device and a power device, the method to be implemented by a mobile device that receives a positioning signal and that keeps on determining a position of the mobile device based on the positioning signal thus received, and the dashboard device that is communicable with the mobile device, the power device including a power switch that is operable to switch between a Key ON state where the dashboard device is powered by the power device and a Key OFF state where the dashboard device is temporarily powered by the power device, the method comprising:
  establishing, by the dashboard device when it is determined by the dashboard device that the power switch is switched to the Key ON state, a wireless connection between the dashboard device and the mobile device;
  recording, by the mobile device, the position of the mobile device thus determined and the time at which the position of the mobile device is determined based on the positioning signal as an entry of recorded position data at predetermined time intervals;

determining, by the mobile device when it is determined by the mobile device that the wireless connection between the dashboard device and the mobile device is interrupted, a latest entry of the recorded position data, the position of the mobile device that corresponds to the latest entry of the recorded position data serving as the last position of the vehicle; and transmitting, by the mobile device, the position of the mobile device that corresponds to the latest entry of the recorded position data and that serves as the last position of the vehicle to a cloud server.

20. The method as claimed in claim 19, further comprising presenting, by the mobile device in a predetermined form of presentation, the last position of the vehicle, a last time of appearance which is associated with the time when the vehicle appears at the last position thereof, and a distance between a current position of the mobile device and the last position of the vehicle;

wherein the predetermined form of presentation includes a compass for navigation that is circular in shape, that is configured to indicate a current orientation of said mobile device, and that includes an arc, a midpoint of which indicates a direction of the last position of the vehicle with respect to the current position of the mobile device, and a length of which indicates a distance between the current position of the mobile device and the last position of the vehicle.

\* \* \* \* \*